Aug. 10, 1937.  A. GOLDEN  2,089,743
MILK BOTTLE HOLDER
Filed July 13, 1936

INVENTOR.
Alzada Golden

Patented Aug. 10, 1937

2,089,743

UNITED STATES PATENT OFFICE 2,089,743

MILK BOTTLE HOLDER

Alzada Golden, La Fayette, Ind.

Application July 13, 1936, Serial No. 90,360

1 Claim. (Cl. 248—312)

This invention aims to provide a simple and inexpensive means for holding a milk bottle in an elevated position, out of the reach of animals.

Figure 1:
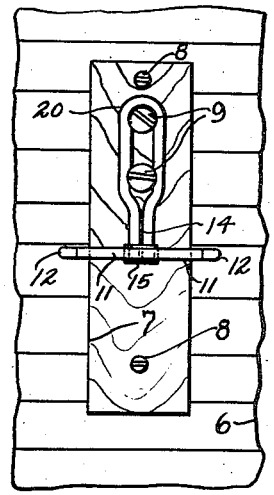
Fig. 1 shows in elevation, a device constructed in accordance with the invention, mounted on a portion of a building.
Figures 2, 3:
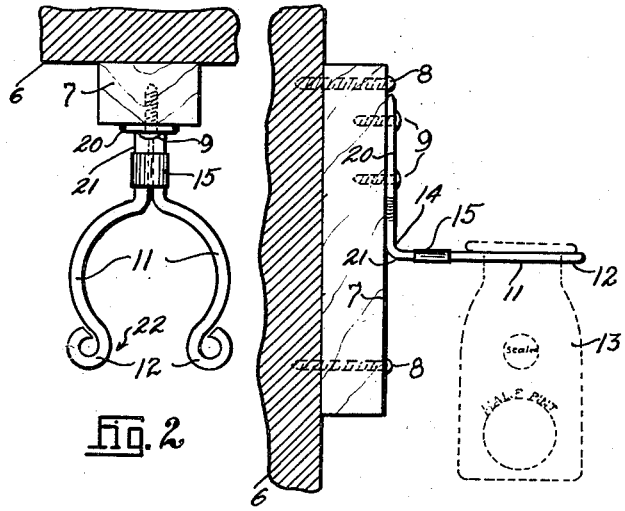
Fig. 2 is a top plan of the structure shown in Fig. 1.
Fig. 3 is a side elevation of the structure shown in Fig. 1.

Referring to Figs. 1, 2 and 3, there is shown a milk bottle holder formed from a single piece of resilient wire fashioned into a vertical, upstanding, elongated loop 20, of such length as to receive a plurality of securing elements 9, the internal transverse diameter of the loop being substantially equal to the diameter of the securing elements. The securing elements 9 hold the device on a block 7, fastened by securing members 8 to the wall 6 of a house, or to any other accessible support.

The side portions of the loop 20 merge into downwardly extended, contacting, parallel members 14, located in the same plane with the loop. The parallel, contacting members 14 extend into forwardly prolonged, contacting parts 21, which are provided at their outer ends with oppositely and outwardly curved arms 11, terminating in curved guiding eyes 12, spaced apart to define an entering throat 22 for a milk bottle 13 which is thrust backwardly between the arms 11 and supported by them, as shown in Fig. 3. The forwardly extended, contacting parts 21, the arms 11 and the eyes 12 are located in a plane substantially at right angles to the plane in which the loop 21 is located.

Figure 4:
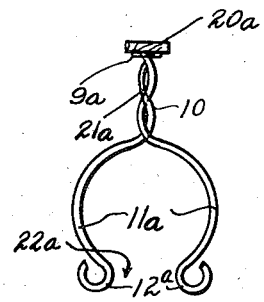
Fig. 4 is a top plan disclosing a modification.
Figure 5:
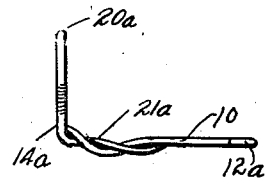
Fig. 5 is a side elevation of the structure shown in Fig. 4.

In order to prevent the arms 11 from spreading apart too widely, especially after long continued use, the forwardly extended, contacting parts 21 may be surrounded by a band clamp 15, or they may have interengaged twisted parts, as in Figs. 4 and 5. In Figs. 4 and 5, elements hereinbefore described have been designated by numerals previously used, with the suffix "a".

Having thus described the invention, what is claimed is:

A milk bottle holder formed from a single piece of resilient wire fashioned into a vertical, upstanding, elongated loop of such length as to receive a plurality of securing elements, the internal transverse diameter of the loop being substantially equal to the diameter of the securing elements employed, the side portions of the loop merging into downwardly extended, contacting, parallel members located in the same plane with the loop, said parallel members extending into forwardly prolonged, contacting parts, which are provided at their outer ends with oppositely and outwardly curved arms, the arms terminating in curved guiding eyes spaced apart to define an entering throat, said forwardly prolonged, contacting parts, the arms and the eyes being located in a plane substantially at right angles to the plane in which the loop is located, and means for holding the forwardly prolonged, contacting parts together.

ALZADA GOLDEN.